United States Patent [19]

Beougher et al.

[11] 4,409,780
[45] Oct. 18, 1983

[54] FOLDING HEADER ASSEMBLY

[75] Inventors: Timothy K. Beougher, Manhattan; Joaquim A. Pipoli, Wichita; Karl K. Visser; Russell B. Bauck, both of Manhattan; Tony K. Lippert, Clay Center, all of Kans.

[73] Assignee: Kansas State University Research Foundation, Manhattan, Kans.

[21] Appl. No.: 357,137

[22] Filed: Mar. 11, 1982

[51] Int. Cl.³ .............................................. A01B 73/00
[52] U.S. Cl. ....................................... 56/228; 56/385; 172/456; 280/411 A
[58] Field of Search ....................... 56/228, 15.9, 16.2; 172/311, 456; 56/385, 6, 7; 280/411 A

[56] References Cited

U.S. PATENT DOCUMENTS

| 3,345,808 | 10/1967 | Van der Lely | 56/228 |
| 3,785,441 | 1/1974 | Sosalia | 172/456 |
| 3,897,832 | 8/1975 | Leedahl et al. | 56/228 |
| 4,042,044 | 8/1977 | Honnold | 172/311 |
| 4,151,886 | 5/1979 | Boetto et al. | 172/311 |
| 4,184,314 | 1/1980 | Hobbs | 56/228 |
| 4,204,575 | 5/1980 | Richardson et al. | 172/311 |
| 4,249,616 | 2/1981 | Moe | 172/501 |
| 4,336,846 | 6/1982 | Boetto | 172/311 |

Primary Examiner—Paul J. Hirsch
Attorney, Agent, or Firm—Tilton, Fallon, Lungmus

[57] ABSTRACT

A folding header assembly for combine harvesters and the like, wherein the header includes a center section transversely mountable at the front of a combine or other support vehicle and a pair of wing sections hingedly connected to the ends of the center section. During header operation, all three sections are disposed in general alignment, but the hinge connections of the wing sections allow them to pivot upwardly and downwardly in adapting to uneven terrain. Despite the substantial width of the extended multi-section header assembly, the wing sections may be easily and automatically folded upwardly, shifted inwardly, and inclined rearwardly for safe road travel within legal width limits and without objectionable interference with a driver's view of the road.

36 Claims, 22 Drawing Figures

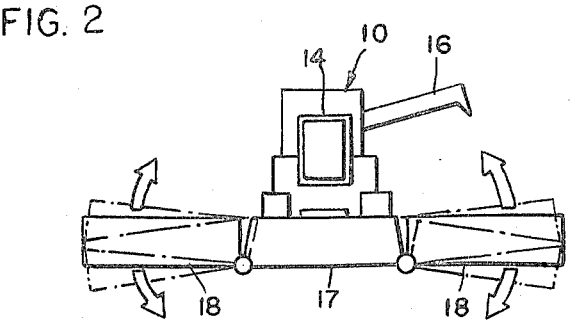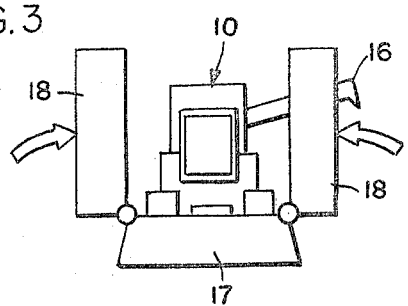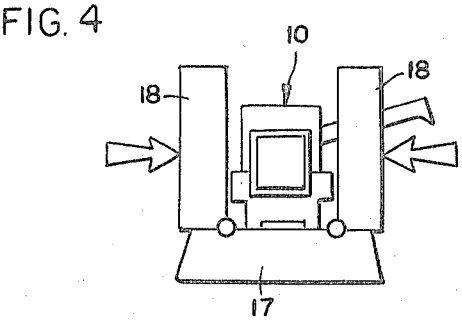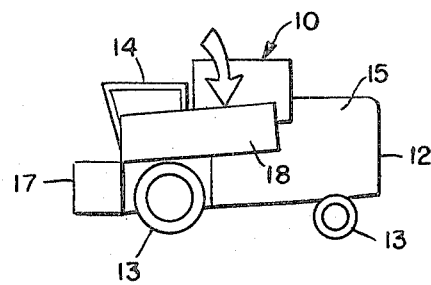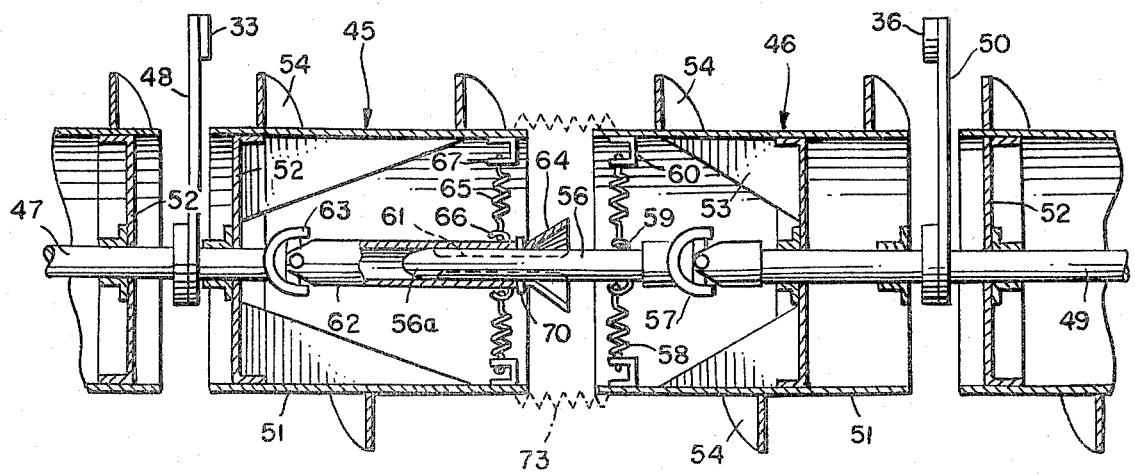

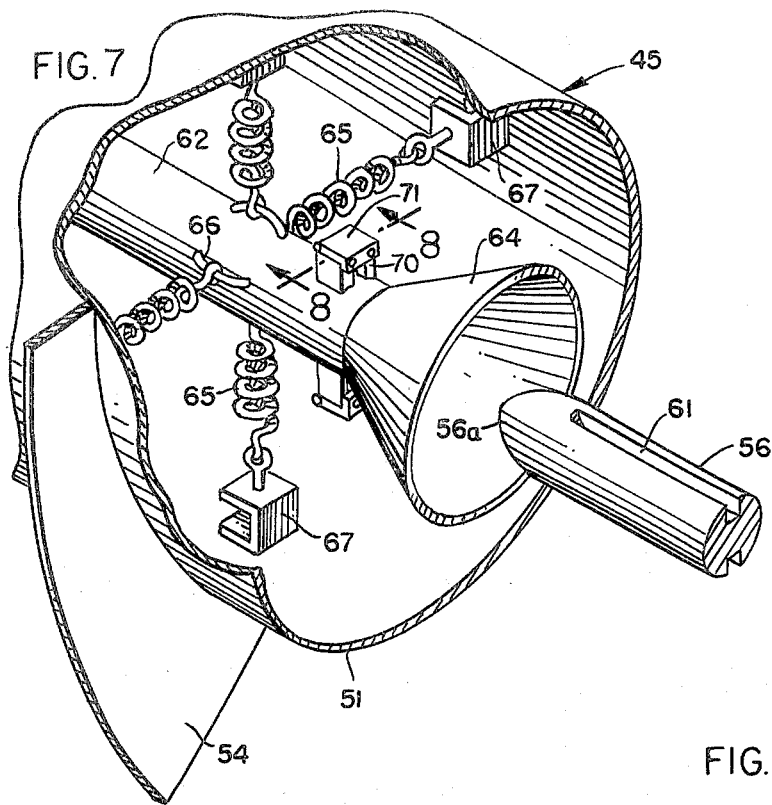
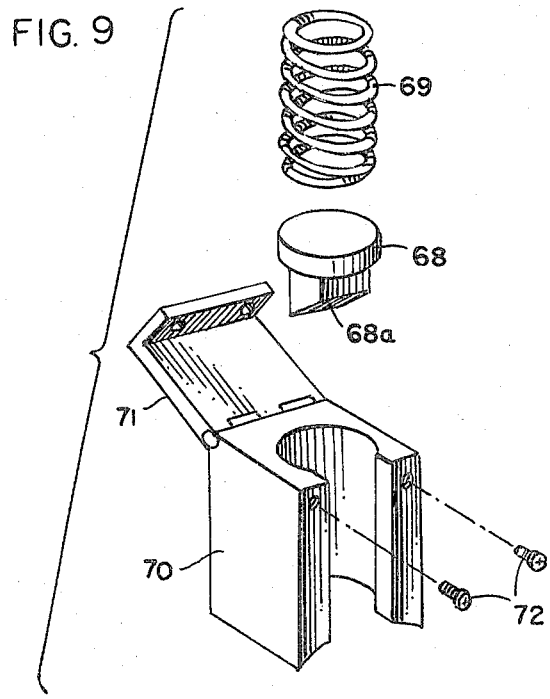
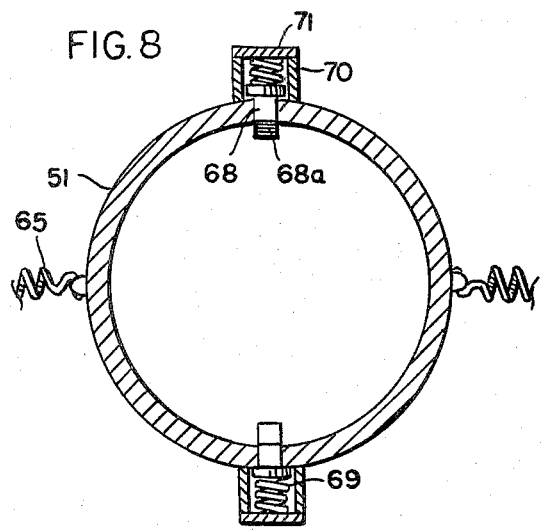

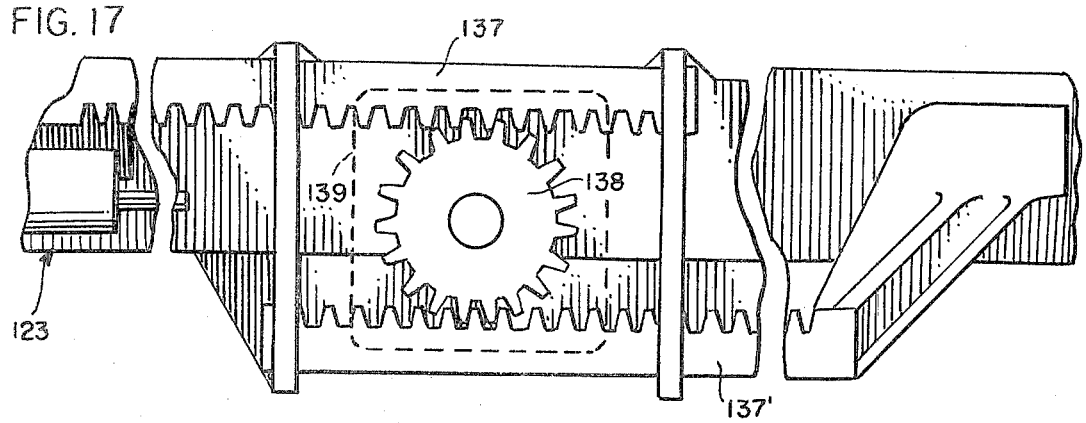
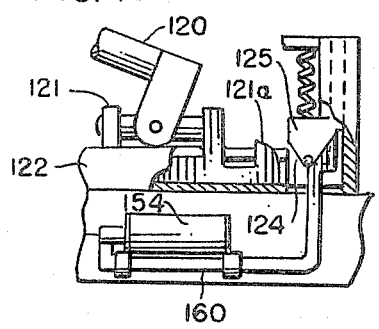
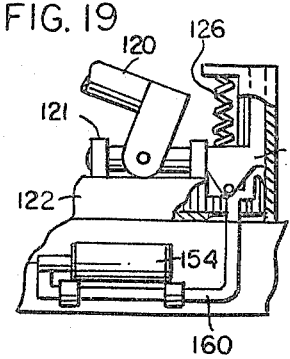
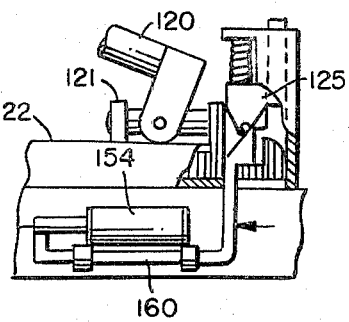
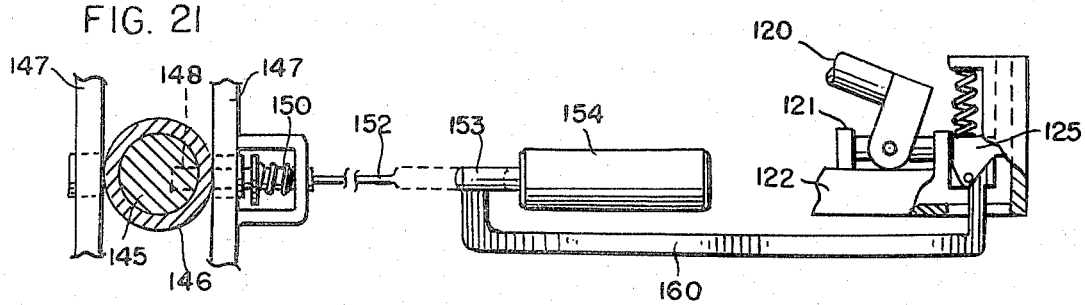
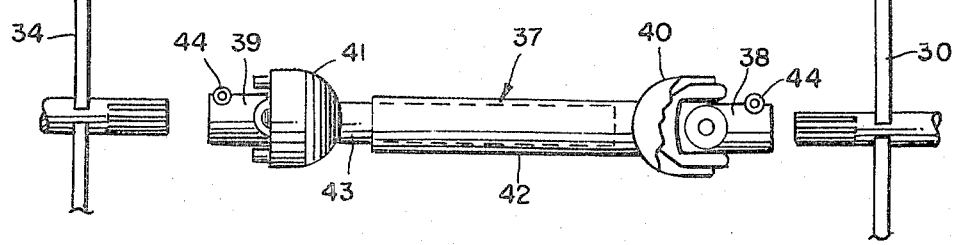

FOLDING HEADER ASSEMBLY

BACKGROUND

Equipment for use in harvesting grain has gone from primitive hand-held tools to sophisticated self-propelled combines in the past 150 years. The size and capacities of harvesting machines have increased as technology has improved. At present, the headers of commercially-available combines are believed to have maximum widths of approximately 30 feet, but there are indications that for greater operating efficiencies many farmers would prefer headers of even greater width. Unfortunately, size increases are commonly associated with problems that offset the advantages of greater efficiency. For example, a commercial 30 foot combine header must be removed from the combine and either trailed behind the unit or hauled on a separate vehicle in order to maintain a suitable width for safe road travel. Such detachment and reattachment is time consuming, presents some risk of injury to the operators during detachment, attachment, loading, and unloading, and involves additional expenses for a trailer or separate vehicle. Another problem that increases with greater header size involves adaptation to uneven terrain. A rigid header of 30 feet in width may conform poorly with changes in terrain, and may become unyieldly and virtually inoperative in traversing terraced or rolling terrain.

Efforts have been made to provide headers which overcome such problems, but such efforts have met with only limited success. U.S. Pat. No. 3,345,808 discloses a harvester having a header divided into a pair of hinged sections that may be raised into generally vertical positions during transport. When the sections are so raised, they generally obstruct the driver's view of the road, and if the header width were increased to take advantage of the collapsing or retracting feature, then the raised sections might also present special problems in traveling beneath bridges, power lines, and other overhead obstructions. Even when the sections are in lowered operative positions, the hinged construction is not free of serious shortcomings. In FIG. 1 of the patent, the header is shown traversing crested terrain; however, as the combine travels over level terrain, and especially as it traverses depressions and concavities that cause the free ends of the hinged sections to swing upwardly, the header will necessarily leave a substantial uncut center swath.

Other patents illustrative of the state of the art are U.S. Pat. Nos. 4,184,314, 4,204,575, 3,897,832, 4,047,575, 4,178,009, 4,249,616, 4,206,815, 4,042,044, 4,084,394, and 4,151,886.

SUMMARY OF THE INVENTION

A main aspect of this invention is to provide a combine header construction which is at least as wide, and preferably substantially wider, than current headers, and yet which overcomes the aforementioned disadvantages of previous high-capacity header designs. Specifically, it is an object to provide an extended-width header that, in its operative condition, will follow the contour of terraced, rolling, and uneven ground without leaving substantial uncut swaths, and which may be mechanically and substantially automatically folded for transport. In such folded or retracted condition, the header has a width within safe legal limits for highway travel, does not obstruct the driver's view of the road, and presents no problems in clearing underpasses, overhead wires, and the like. Such objectives may be achieved with a header that, in unfolded operative condition, has a cutting width of 40 feet or more.

Briefly, the folding header assembly is formed in three sections. A center section is secured to the combine or other vehicle and a pair of wing sections are normally disposed at opposite ends of the center section in general horizontal alignment therewith. Upper and lower hinge assemblies are provided at each end of the center section, each hinge assembly including a pair of engagable and disengagable hinge elements, one of which is mounted on the center section and the other on a wing section. During operation of the combine, only the lower hinge assemblies are operative and allow limited upward and downward pivotal movement of the wing sections to permit such sections to follow uneven terrain. During a folding operation, the lower hinge assemblies become inoperative and the wing sections are pivoted upwardly about the upper hinge assemblies. By so providing upper and lower sets of hinges that are mutually exclusive in operation, the advantages of header folding for transit purposes, and of header flexing to conform with uneven terrain during combine operation, are achieved without leaving substantial uncut areas or swaths between the respective sections.

In the disclosed embodiment, the wing sections, after being pivoted upwardly into their raised positions, are then shifted inwardly until the total header width is that of the center section, and are then pivoted rearwardly and downwardly to assume generally horizontal positions alongside the combine. The steps of elevating, retracting, and laying back the wing sections, and the reversal of those steps when the header is to be extended into operative condition, are performed under power and essentially automatically, being controlled by the operator from the cab of the combine through a microprocessor controlling switches in sequence. Despite the complexity of the sequential operations, the same power cylinders are used to perform the tasks of both folding the wing sections upwardly and thereafter pivoting such sections rearwardly into their lay-back positions. The wing and center sections are provided with auger sections which automatically couple and uncouple when the wing sections are lowered and raised. When the auger sections are coupled, so that power applied to the outer auger sections will be transmitted to the inner section (or vice versa), such coupling nevertheless permits the outer auger sections to pivot upwardly and downwardly as the wing sections of the header pivot about the lower hinge assemblies in traversing uneven terrain.

Other features, objects, and advantages of the invention will become apparent from the specification and drawings.

DRAWINGS

FIG. 2 is a simplified and somewhat schematic front elevational view of a combine with the header assembly in operating condition, illustrating the range of pivotal movement of the wing sections about the lower hinge assemblies as the header travels over uneven terrain.

FIGS. 3–5 are simplified and somewhat schematic views illustrating the steps of folding the wing sections upwardly, shifting them inwardly, and swinging them rearwardly into their lay-back positions.

FIG. 6 is a fragmentary sectional view showing the interconnection between the auger sections of the header assembly.

FIG. 7 is a fragmentary perspective view showing details of the relationship between the auger sections of the header assembly.

FIG. 8 is an enlarged sectional view along line 8—8 of FIG. 7.

FIG. 9 is an exploded perspective view of the housing and spring-loaded pin construction for operatively coupling adjacent auger sections.

FIG. 17 is a fragmentary view of the rack and pinion structure for simultaneously shifting the wing sections inwardly and outwardly.

FIGS. 18–20 are a series of schematic views showing the sequence for locking and unlocking the support bar of a wing section during folding and unfolding of a wing section.

FIG. 21 is a somewhat schematic view showing the relationship between a three-position power cylinder, the locking pin for an anchor rod and sleeve, and the latch mechanism for a wing section support arm.

FIG. 22 is an elevational view showing a telescoping coupling useful for joining the reel sections of adjacent header sections after the wing sections of the header assembly have been extended into operating positions.

DETAILED DESCRIPTION OF PREFERRED EMBODIMENT

Figure 1:
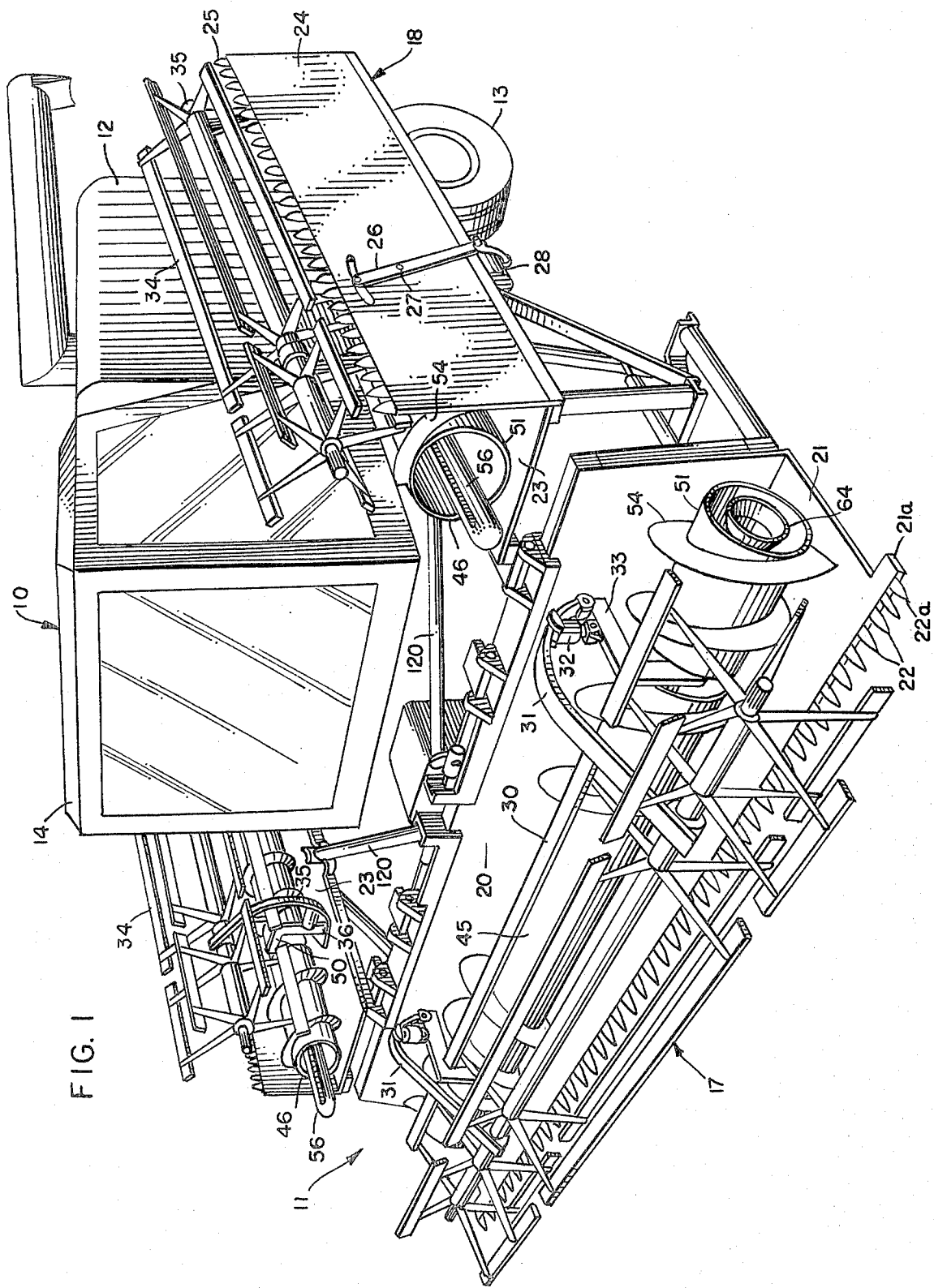
FIG. 1 is a perspective view of a combine and folding header assembly embodying the present invention.

Referring to the drawings, the numeral 10 generally designates a combine equipped with a folding header assembly 11 embodying the invention. The combine typically includes a chassis 12 supported by wheels 13, a cab 14 at the front of the vehicle, a housing 15 for receiving grain, and a discharge tube or chute 16 for the controlled discharge of grain collected by the combine. Since self-propelled combine harvesters are well known in the art, a more detailed discussion of their construction and operation, apart from folding header assembly 11, is believed unnecessary herein. While a combine harvester 10 has been illustrated as the power-operated vehicle upon which the header assembly 11 of this invention is mounted, it will be evident from the following description that other types of vehicles might be used in conjunction with a header assembly having the folding, retracting, and laying back operations described herein.

The header assembly 11 includes a main or center section 17 and a pair of wing sections 18. When the assembly is in operative condition for harvesting, the three sections are in general alignment as depicted schematically in FIG. 2. The center section 17 extends across the front of combine 10 and is securely mounted thereon. Wing sections 18 continue beyond the ends of the center section and are hingedly connected to the center section for limited upward and downward pivotal movement as indicated in broken lines. When the header is to be folded for transit, the wing sections 18 are first pivoted upwardly (FIG. 3), then shifted or retracted inwardly (FIG. 4), and finally pivoted downwardly and rearwardly (FIGS. 1 and 5).

The center section 17 of the header assembly includes a vertically-oriented, transversely-elongated rear wall or panel 20 and a lower horizontal cutter plate 21. Along the leading edge of the cutter plate 21 are a series of teeth 22 carried by conventional cutter bars (not shown). Similarly, each wing section 18, when viewed in its horizontally-extended operating position, has an upstanding rear wall or panel 23 and a bottom cutter plate 24. The teeth 25 of each wing section 18 are similarly carried by cutter bars (not shown), with each bar carrying alternate teeth of the series, and one of the bars being stationary with respect to cutter plate 24 while the other bar being mounted for reciprocating movement. In FIG. 1, the movable cutter bar is indicated as being reciprocated by sickle drive arm 26 pivotally mounted upon the cutter plate 24 at point 27. One end of the drive arm is operatively connected to one of the cutter bars, the other end is connected to wobble mechanism 28. The wobble mechanism may take the form of a standard wobble box driven by a central power source, or it may constitute a suitable hydraulic motor capable of imparting oscillating movement of sickle drive arm 26. The cutter blades or teeth of both wing sections and the center section are similarly driven, and it will be noted from FIG. 1 that the ends 21a of the cutter plate 21 of the center section are extended laterally so that the teeth 22a projecting forwardly from those extensions will be disposed slightly in front of the inboard teeth of the wing sections 18 when those wing sections are in horizontal alignment with the center section 17. The purpose of the overlap is to insure that uncut strips will not be left when the combine is in operation and the wing sections flex upwardly in traversing uneven terrain.

The center section is provided with a reel 30 carried by reel support arms 31 above and slightly ahead of cutter blades or teeth 22. Hydraulic cylinders 32, mounted on horizontal support members 33 affixed to rear wall 20, may be expanded and contracted to adjust the height of the reel, all as well known in the art. Reels 34 are similarly carried by support arms 35 mounted upon the members 36 and rear panels 23 of wing sections 18 (FIG. 1). The reels may be conventionally operated by a hydraulic motor, the power preferably being supplied to the shaft of only one of the reels and the adjacent ends of the aligned shafts (when the wing sections are horizontally extended) may then be joined by any suitable coupling means. FIG. 22 illustrates a coupler 37 having a pair of sockets 38, 39 carried by universal joints 40 and 41, respectively. Universal joint 40 is secured to one end of a telescoping tube 42, the other joint 41 being affixed to tube 43 slidably received within tube 42. Socket 38 receives the splined shaft end of one of the reels, such as the reel 30 of center section 17, and socket 39 receives the end of a reel 34 of one of the wing sections 18. Screws 44 are tightened to maintain the shaft ends within sockets 38 and 39.

As shown most clearly in FIG. 1, each of the header sections carries an auger section. Specifically, center section 17 rotatably supports auger section 45, and wing sections 18 carry auger sections 46. The center auger section has a central mounting shaft 47 (FIG. 6) rotatably carried by vertical mounting members 48 projecting downwardly from horizontal mounting members 33 (FIG. 1). Each wing auger section 46 is similarly provided with a mounting shaft 49 rotatably carried by vertical mounting members 50 which in turn are secured to members 36.

Each auger section includes a cylindrical outer tube or shell 51 secured to the auger shafts by end plates 52 and rib flanges 53 (FIG. 6). The cylindrical shells of both the center auger section 45 and the wing auger sections 46 are interrupted along their lengths, as shown in FIGS. 1 and 6, to accommodate the supporting member 48 and 50 to which auger shafts 47 and 49 are journaled. The spiral blades or flighting 54 of the auger sections 45 and 46 are secured to the outer shells or tubes as illustrated in FIGS. 1, 6, and 7.

The structure for automatically coupling and uncoupling the auger sections, and for maintaining positive driving connection in all three auger sections during upward and downward pivoting of the header's wing sections (FIG. 2), is depicted most clearly in FIGS. 6-9. Each auger wing section 46 is provided at its inner end (i.e., the end that faces the center auger section 45 when the sections are aligned) with a shaft extension 56 that projects well beyond the inner end of the cylindrical shell 51 of that section and which is connected to the main central shaft 49 by means of a universal joint 57. Shaft extension 56 is supported so that it extends generally along the axis of the auger, in the absence of distorting forces, by a plurality (four) radially-extending helical tensioning springs 58 secured at their inner ends to hooks 59 along the outside of the shaft extension and at their outer ends to brackets 60 affixed to the inside surface of shell 51. It will be observed from FIGS. 6 and 7 that the free end 56a of shaft extension 56 is rounded and that a pair of diametrically-disposed grooves 61 extend longitudinally along the surface of the shaft extension.

Opposite ends of the main shaft 47 of the center auger section 45 are provided with tubular extensions 62 connected to the main shaft by universal joints 63. The outboard ends of the tubular extensions 62 are flared outwardly to provide frusto-conical guides 64 for directing the rounded ends of shaft extensions 56 into the tube extensions 62 when the header assembly is being unfolded or extended. Radial springs 65, similar to springs 58 of the wing sections, have their inner ends connected to hooks 66 of tube extensions 62 and their outer ends secured to brackets 67 (FIG. 7). The springs 65 and 58 therefore suspend the tube extensions 62 and shaft extensions 56 in centered or axial positions to facilitate coupling operations, while also allowing pivoting operation of universal joints 63 and 57 during combine operation.

During combine operation, when the center and wing sections of the auger are in general alignment as depicted in FIG. 6, the shaft extension 56 of each wing section 46 projects a substantial distance into tube extension 62 of the center auger section 45. Upward and downward pivoting of the wing sections 18 of the header to conform to uneven terrain (which may be referred to generally as header "flexing," in contrast to header "folding" for transit) results in pivoting action of universal joints 57 and 63 and limited axial sliding movement of shaft extension 56 within tube extension 62. The parts are nevertheless locked against relative rotational movement by means of springloaded pins 68 received within grooves or keyways 61 of shaft extension 56 (FIGS. 8, 9). Each pin has its beveled inner end 68a urged into the interior of tube extension 62 by a coil spring 69 disposed within housing 70. During a coupling operation, as the rounded end or nose 56a of shaft extension 56 is urged into extension tube 62, pins 68 may be forced into retracted positions until relative rotation of the parts brings the pins into alignment with keyways 61. The inner ends of the pins then seat in the keyways and lock the shafts of the respective auger sections against independent relative rotation. As shown most clearly in FIG. 9, each pin housing 70 is provided with a hinged cover 71 which may be easily opened by removal of screws 72 to facilitate removal and insertion of pins whenever replacement becomes necessary.

When the header assembly is extended as illustrated in FIG. 2, so that the auger sections are aligned and coupled for operation, it may be desirable to join the adjacent ends of the outer shells or tubes 51 by means of protective sleeves 73. The sleeves may be formed of heavy rubber or other elastomeric material, and may have accordion folds as shown in FIG. 6, to accommodate upward and downward pivotal movement of the wing sections as the header assembly flexes during combine operation.

Figure 10:
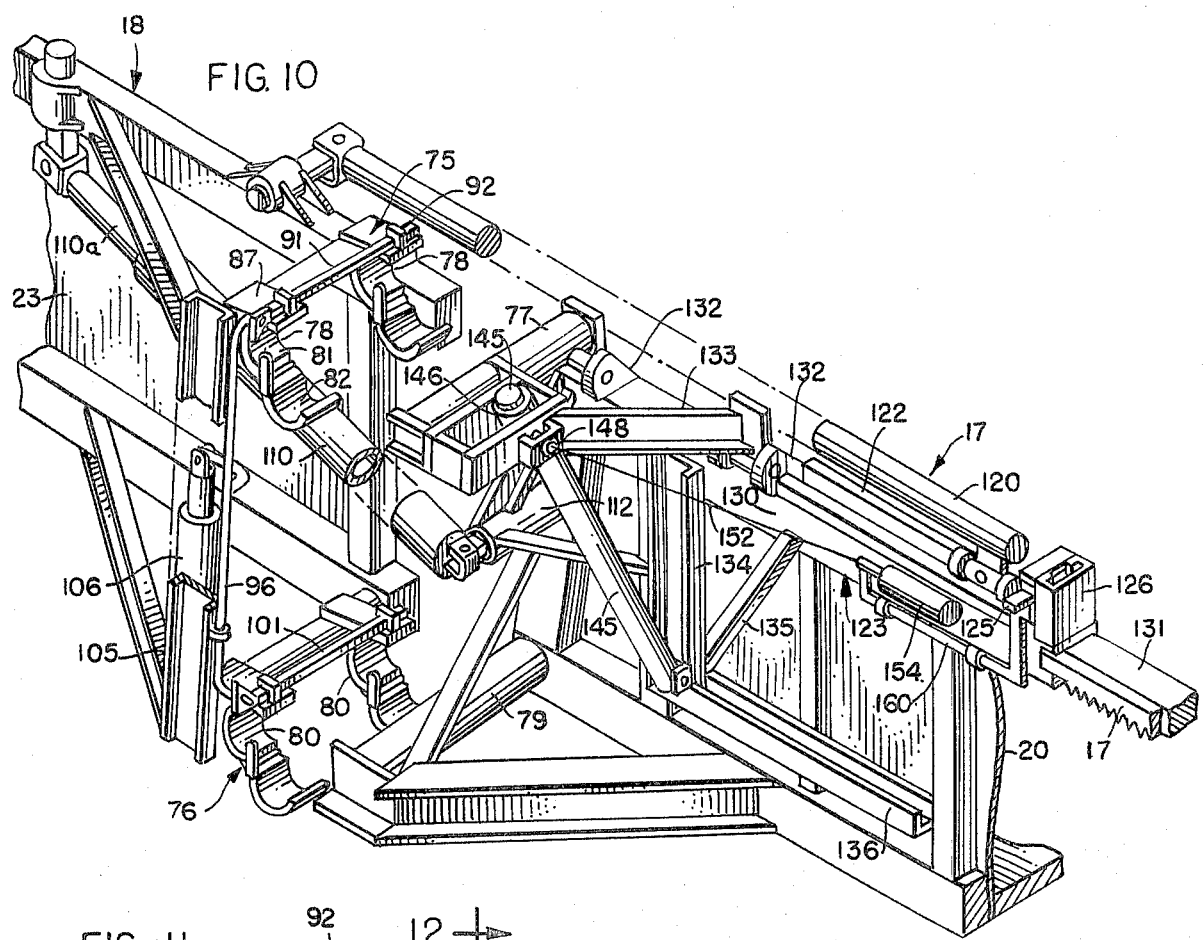
FIG. 10 is a fragmentary perspective view showing the hinging arrangement of the center and wing sections of the header assembly, such sections being shown in completely separated condition for illustrative purposes.

The structure for upward and downward folding of the wing sections of the header assembly, as well as permitting limited flexure of those sections during field operation, is illustrated in FIGS. 10-14. FIG. 10 is an exploded fragmentary rear perspective view, showing wing section 18 completely disengaged from center section 17, to reveal the basic operating mechanism. Elements not directly involved in the hinging system are omitted for clarity of illustration. The adjacent ends of the wing and center sections are provided with a pair of upper and lower hinge assemblies 75 and 76 which are coordinated in their operation so that during field work, as each wing section 18 flexes upwardly and downwardly, only the lower hinge assembly 76 is operative, and during folding or unfolding operations, when the wing section 18 is raised or lowered, only the upper hinge assembly 75 is functional.

The upper hinge assembly 75 includes a hinge bar 77 provided by one of the header sections (center section 17) and at least one hinge clamp provided by the other of the sections (wing section 18). In the embodiment illustrated, a pair of spaced hinge clamps 78 are engagable with hinge bar 77. Similarly, the lower hinge assembly 76 takes the form of a lower hinge bar 79 carried by the center section and a pair of hinge clamps 80 mounted on the wing section 18. All of the hinge clamps 78, 80 are essentially of the same construction, as shown in detail in FIGS. 11 and 12. Therefore, it will be understood that a description of the structure and operation of one of the clamps is applicable to all of them.

Figure 11:
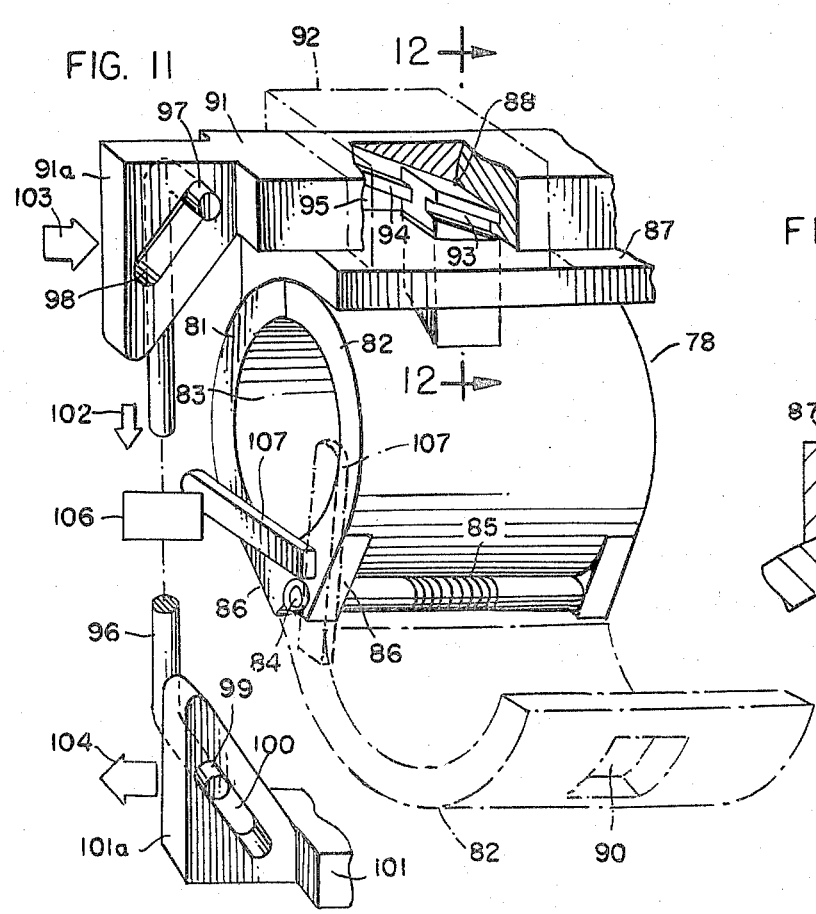
FIG. 11 is an enlarged fragmentary perspective view illustrating one of the hinge assemblies.
Figure 12:
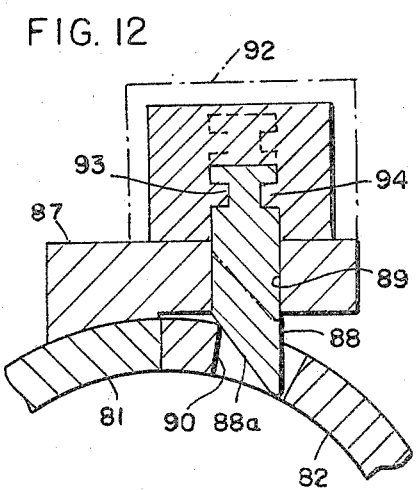
FIG. 12 is a further enlarged sectional view along line 12—12 of FIG. 11.

Referring to FIGS. 11 and 12, clamp 78 includes a fixed jaw 81 and a swingable jaw 82. Both jaws are arcuate and, when closed as shown in solid lines in FIG. 11, define a cylindrical opening 83 for rotatably receiving cylindrical hinge bar 77. The jaws are pivotally connected to each other by hinge pin 84, and a coil spring 85 exerts a force urging the swingable jaw 82 into open position as represented in broken lines. The jaws are provided with stop elements 86 which limit opening movement of the swinging jaw to the extent shown.

The fixed jaw 81 is rigidly secured to frame member 87 of wing section 18. A locking or latching pin 88 extends through opening 89 in frame member 87 for reciprocable movement between the locking position shown in solid lines in FIG. 12 and the unlocking position depicted in broken lines. In its locking position, the pin or member 88 has its tip portion received within an aperture 90 formed in swingable clamping jaw 82.

Movement of the pin between its locking and unlocking positions is controlled by a camming bar 91 slidably mounted upon frame member 87. The bar 91 is slidably retained on the frame member by inverted U-shaped guide elements 92 represented in phantom in FIGS. 11 and 12. At its upper end, each locking pin 88 is provided with a pair of angular channels 93 that receive sloping rails 94 formed in a recess 95 within camming bar 91. Therefore, as the camming bar is slid one direction or the other, the locking pins 88 are raised and lowered.

The means for actuating the locking pins includes a connecting bar 96 operatively engaging the camming bars of the upper and lower hinge assemblies 75, 76. Specifically, the upper end portion 97 of the connecting bar is received within an angular slot 98 formed in extension 91a of camming bar 91, and the lower end portion 99 of the connecting bar 96 is similarly received within angular slot 100 formed in a similar extension 101a of lower camming bar 101. It will be noted in FIG. 11 that the end portions 97 and 99 are at opposite ends of their respective slots 98, 100, so that downward movement of the connecting bar in the direction represented by arrow 102 will cause the upper camming bar 91 to slide in the direction of arrow 103, causing locking pin 88 to retract into its unlocking position, while simultaneously causing the lower camming bar 101 to shift in the opposite direction represented by arrow 104, resulting in movement of the locking pins of the lower hinge assembly 76 into their locking positions.

Connecting bar 96 is movably mounted upon frame member 105 of header wing section 18 in the manner depicted in FIG. 10. Power means, preferably a hydraulic double-acting cylinder 106, is also mounted on frame member 105 and is operatively connected to bar 96 for shifting the bar between its raised and lowered positions, thereby moving the locking pins or members 88 between their locking and unlocking positions. Although the header sections 17 and 18 are shown to be separated in FIG. 10 for purposes of illustration, it is to be understood that either the upper hinge assembly 75 or the lower hinge assembly 76 will be coupled at any given time, depending on the position of connecting bar 96, and that when the header apparatus is fully assembled, the upper and lower hinge assemblies are never both coupled or both uncoupled.

The swingable clamping jaw 82 of each hinge clamp is equipped with a lever 107 which projects upwardly when the hinge clamp is in open condition (FIGS. 10, 11). With the clamp in open condition, the actuating lever is positioned to engage hinge bar 77 (or 79), causing the swingable jaw 82 to pivot upwardly into a partially closed position. If at the same time the locking pin 88 associated with that hinge assembly is shifted into its lowered or locking position, the sloping undersurface 88a of the locking pin engages the edge of opening 90 in the swingable jaw 82 and cams that jaw into its fully closed position (FIG. 12).

Figure 13:
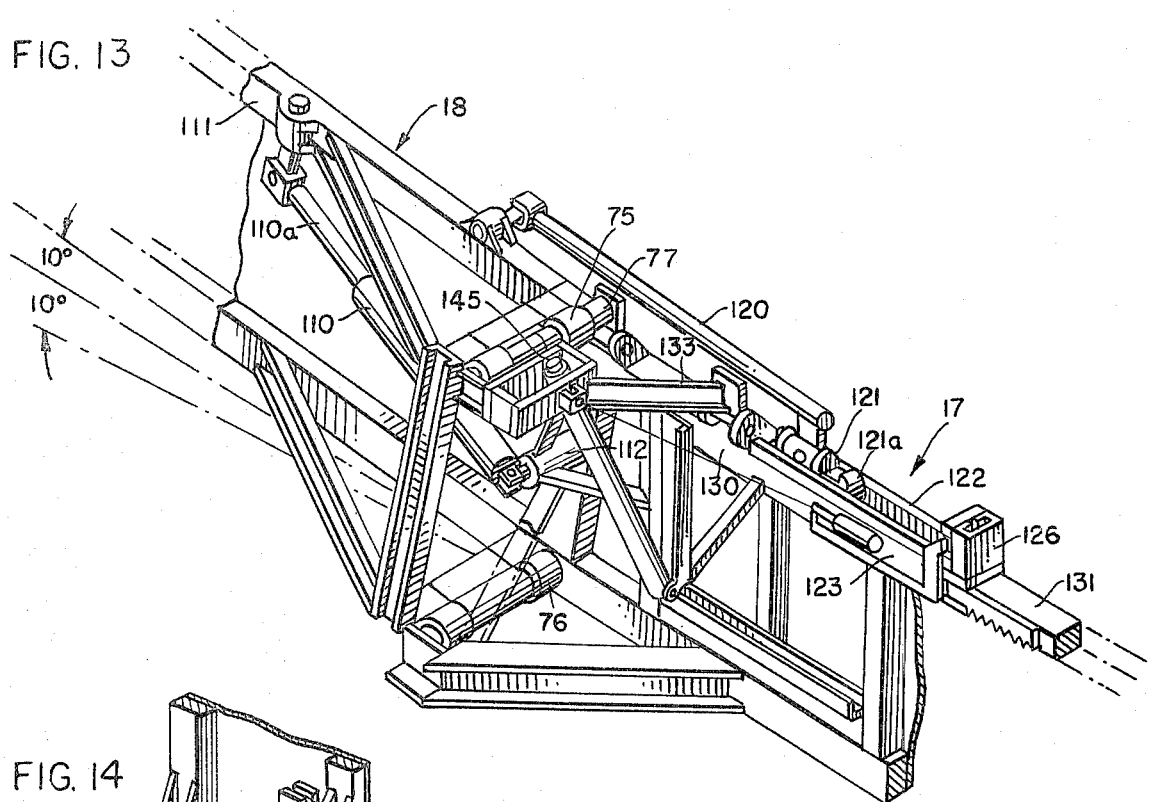
FIG. 13 is a perspective view similar to FIG. 10 but showing the relationship between the center and wing sections when the wing sections of the header assembly are flexed upwardly during field operation as well as during the initial step in preparation for upward folding of the wing sections for transit.

FIGS. 13-16 are patterned after FIG. 10 and show the wing section 18 in different positions of adjustment. Although the upper and lower hinge assemblies 75, 76 are shown, the locking and actuating mechanisms described above, and shown in FIGS. 10-12, are omitted from FIGS. 13-16 to avoid obscuring other structural features. FIG. 13 depicts the header assembly with wing section 18 in extended position, as it would appear during field operation, but with the wing section flexed upwardly at an angle of 10° as might occur should the wing section ride over slightly elevated terrain. The lower hinge assembly 76 is coupled and operational with the lower hinge clamp closed and locked in the manner already described. Although the hinge clamps of the upper hinge assembly appear closed, they are unlocked and will open freely to permit downward flexing of the wing section 18 as ground contour changes. It is believed that a range of flexing movement of 10° either upwardly or downwardly from the horizontal (i.e., a total of 20° movement) permits the header to follow most ground contours encountered in grain harvesting. The extent of upward pivotal movement of each wing section 18 during field operation is limited by the slope at the ends of center section 17 (note FIG. 2) and by the location of the upper hinge assembly 75 which, as represented in the drawings, is slightly inboard of lower hinge assembly 76.

Figure 14:
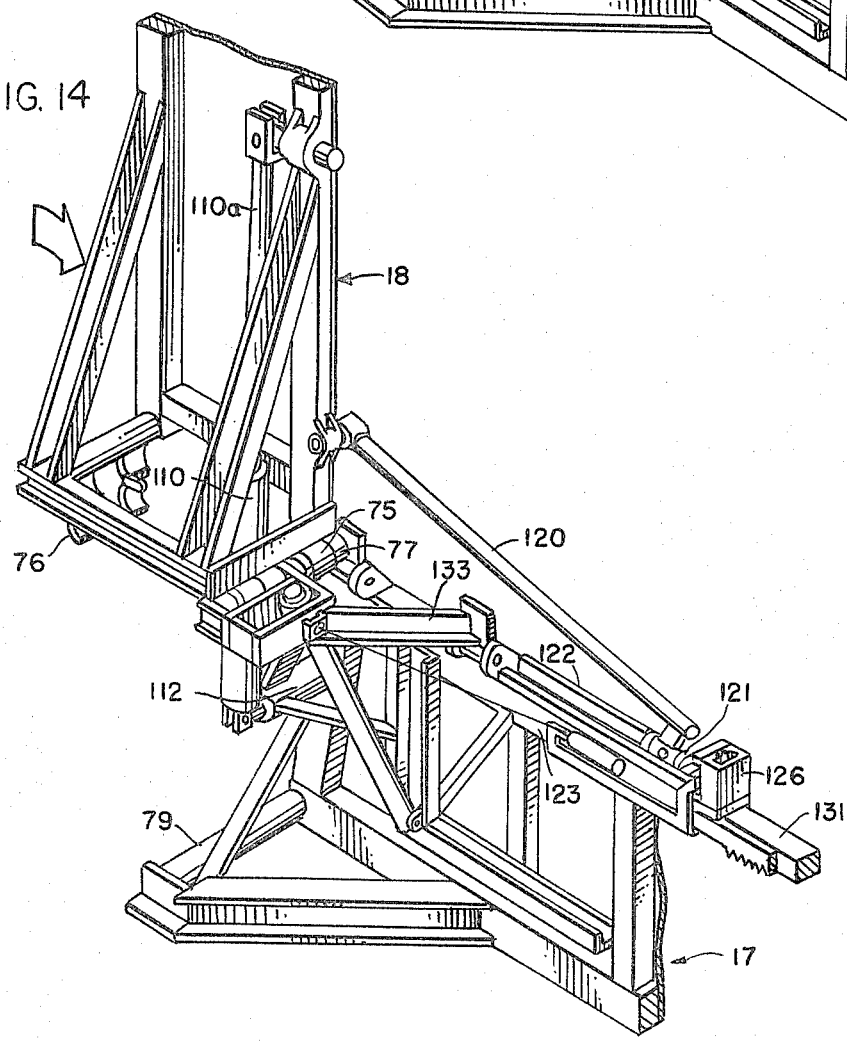
FIG. 14 is a perspective view similar to FIG. 13 but illustrating the hinge structure when a wing section has been pivoted into its raised position.

Referring to FIGS. 10, 13, and 14, a double-acting wing-folding cylinder 110 extends between the upper frame member 111 of wing section 18 and the rear end of a mounting member 112 secured to the rear of center section 17 adjacent the sloping end of the latter section and at a point intermediate the upper and lower limits of the center section. More specifically, the end of the cylinder 110 is pivotally connected to member 112 at a point normally spaced below and behind the point of pivotal connection between the piston 110a of the hydraulic cylinder and wing section 18. Therefore, with the header assembly in its normal operating condition (i.e., with each wing section 18 in general horizontal alignment with the center section 17) contraction of each hydraulic cylinder 110 will cause each wing section 18 to pivot into the slightly inclined position illustrated in FIG. 13. If the upper hinge assembly is then locked or coupled, and the lower hinge assembly 76 is uncoupled, expansion of hydraulic cylinder 110 will cause each wing assembly to pivot upwardly into the fully raised position represented in FIG. 14.

A support arm or bar 120 is pivotally connected at one end to frame member 111 of the wing section 18 and at its opposite end to a rider 121 retained for movement along track 122 secured to carriage 123. As the hydraulic cylinder 110 expands to elevate wing section 18, rider 121 travels inwardly along track 122 until striker portion 121a of the rider engages the sloping surface 124 of spring-loaded latch 125 and cams the latch into a raised position (FIGS. 18, 19, 20). With continued movement of the rider as the wing section approaches its fully raised position, spring 126 urges the latch downwardly behind striker 121a to latch the rider 121 against further movement (FIG. 19). The hydraulic cylinder 110 is therefore no longer needed to support the header wing section 18 in its fully raised position; that function is assumed by support arm 120 since its rider 121 is latched against further movement along track 122.

Latch 125 may be mounted for movement between latching and unlatching positions by any suitable support means. In the embodiment illustrated, latch 125 is carried by upstanding channel member 126 secured to the inboard end of track 122.

Support arm 120 prevents reverse swinging movement of the raised wing section 18 during the next step in the folding sequence during which each wing section is retracted or displaced inwardly (FIG. 4). This is necessary because the hydraulic cylinder 110 must go into "float" during inward retraction of the wing section and thus cannot support that section in its vertical position.

Carriage 123 includes an elongated member 130 of generally inverted U-shaped cross section that is slidable inwardly and outwardly along upper frame member 131 of center header section 17 (FIGS. 10 and 13–15). As shown most clearly in FIG. 10, ears 132 are secured to the outboard end portion of member 130 and pivotally support upper hinge bar 77 and its bracing arm 133. The carriage also includes a vertical member 134 permanently secured at its upper end to member 130 and preferably braced by angle bar 135. The vertical member 134 has its lower end guided for movement along the horizontal track defined by channel 136, such channel being a stationary part of center header section 17. At its inner end, carriage 123 is provided with a horizontal rack gear 137 which engages a pinion 138 driven by a hydraulic motor 139 or by any other suitable power means (FIG. 17). The construction at the opposite side of the header assembly is substantially the same as already described except that the rack gear 137' of the other carriage is disposed beneath pinion 138 rather than above that pinion. As the pinion is driven one way or the other by the power unit 139, the respective carriages 123 are simultaneously extended and retracted. During such retraction, limited expansion of the hydraulic cylinder 110 necessarily occurs; hence, the "floating" action previously described in which fluid is allowed to flow into and out of opposite ends of the cylinder so that the hydraulic cylinder 110 provides no interference to inward displacement or retraction of each wing section 18.

Figure 15:
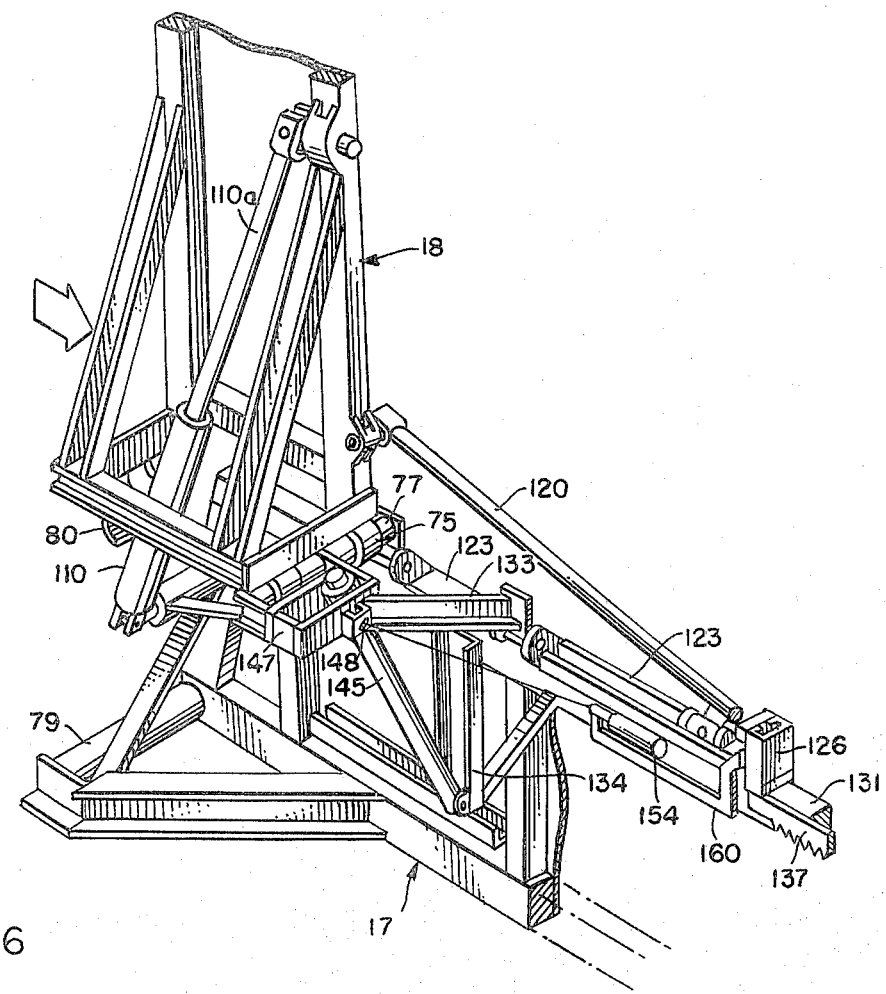
FIG. 15 is a perspective view showing the relationship of parts when a raised wing section has been shifted inwardly.
Figure 16:
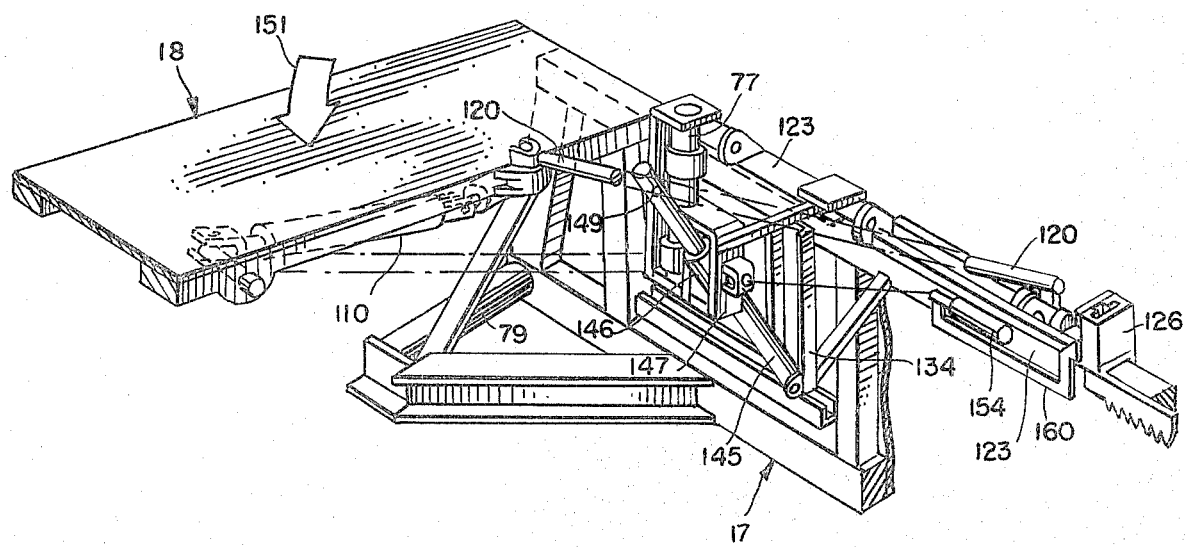
FIG. 16 is a perspective view similar to FIG. 15 but showing the inwardly-displaced wing section after it has been pivoted downwardly and rearwardly into its lay-back positions.

FIG. 15 illustrates one of the wing sections 18 in its fully retracted or inwardly-displaced position. In such position, the outer limits of each wing section 18 should be approximately the same, and in any case no substantial distance laterally beyond, the outer lower ends of center section 17 (FIG. 4). In its raised and retracted position, each wing section 18 is ready for the final step of rearward pivoting or laying back (FIGS. 5, 16).

Although upper hinge bar 77 is pivotally mounted on carriage 123, pivotal movement is normally prevented by an anchor rod 145 which is pivotally connected at its lower end to the lower end of vertical carriage member 134. A collar 146 pivotally carried by bracket 147 slidably receives the upwardly and rearwardly inclined anchor bar, but is normally locked against sliding movement with respect to that bar by pin 148 that enters opening 149 at the upper end of that bar (FIGS. 16, 21). Since bracket 147 is rigidly secured to the upper hinge bar 77, pin 148, urged into opening 149 by spring 150, normally locks the hinge bar 77 in the horizontal position of FIGS. 10 and 13–15. However, upon retraction of pin 148, the upper hinge bar 77, along with the entire wing section 18, is free to pivot downwardly and rearwardly into the lay-back position depicted in FIG. 16. The driving force for laying back is provided by double-acting hydraulic cylinder 110. Upon reversal of fluid flow, causing retraction of that cylinder, wing section 18 swings rearwardly and downwardly in the direction indicated by arrow 151 in FIG. 16.

Any suitable means may be used to retract pin 148. In the embodiment illustrated, it has been found advantageous to use a cable 152 connecting the pin to the piston 153 of a double-acting cylinder 154 mounted on carriage 123. As shown in FIG. 21, the piston 153 shifts between three positions: a fully extended position depicted in broken lines, a fully retracted position, and the intermediate or neutral position shown in solid lines. Retraction of the piston from the position shown results in retraction of locking pin 148. When the piston returns to its neutral intermediate position, the spring-loaded pin 148 will be set to reseat in the opening 149 of the anchor bar whenever the wing section 18 is returned to the elevated position (FIG. 15) from its lay-back position (FIG. 16). Such reversal is achieved simply by reversing the direction of flow through double-acting cylinder 110 to cause expansion of that cylinder.

When expansion of cylinder 110 has returned the wing section to its raised position, the hydraulic motor is actuated to rotate pinion 138, displacing the carriages and wing sections 18 outwardly into the positions of FIG 14. Cylinder 154 is then actuated to urge piston 153 into its fully extended position. A tripping bar 160, coupled to piston 153 and slidably carried by carriage 123, engages latch 125 and cams the latch into its raised or unlatching position. Lowering of the raised wing sections into operative positions is achieved by reversal of the folding step already described; specifically, by redirecting fluid flow in each double-acting cylinder 110 to retract the cylinder and cause each wing section to pivot downwardly into the operative position depicted in FIG. 13. The upper hinge assemblies 75 are uncoupled and the lower hinge assemblies 76 simultaneously coupled to prepare the header for field operation.

While in the foregoing we have disclosed an embodiment of the invention in considerable detail for purposes of illustration, it will be understood by those skilled in the art that many of these details may be varied without departing from the spirit and scope of the invention.

We claim:

1. A folding header assembly for combines and the like comprising a center section and a pair of wing sections; said center section being adapted for horizontal attachment across the front of a combine and said wing sections being normally disposed at opposite ends of said center section and in general horizontal alignment therewith; a pair of vertically-spaced upper and lower hinge assemblies disposed at each end of said center section between said center section and said wing sections; each hinge assembly having hinge elements capable of being coupled and uncoupled; and actuating means connected to each pair of upper and lower hinge assemblies for selectively coupling only one of the assemblies of each pair while uncoupling the other of the assemblies of each pair; said wing sections being pivotally movable upwardly and downwardly about the pivot axes of the lower hinge assemblies of each pair, when said lower hinge assemblies are coupled and said upper hinge assemblies are uncoupled, to allow said wing sections to travel over uneven terrain; said wing sections being foldable upwardly about the pivot axes of said upper hinge assemblies, when said upper hinge assemblies are coupled and said lower hinge assemblies are uncoupled, to reduce the width of said header assembly in transit.

2. The folding header assembly of claim 1 in which the pivot axes of said upper and lower hinge assemblies are normally disposed in substantially parallel relation.

3. The folding header assembly of claim 2 in which said pivot axes of said upper and lower hinge assemblies are normally horizontal.

4. The folding header assembly of claim 1 in which the elements of each of said hinge assemblies include a hinge bar provided by one of said sections and at least one hinge clamp provided by an adjacent section.

5. The folding header assembly of claim 4 in which said hinge clamp includes a pair of arcuate clamping jaws pivotally connected for relative movement between open and closed positions; said jaws, when closed, rotatably receiving and retaining said hinge bar and, when open, allowing disengagement of said bar from said clamp.

6. The folding header assembly of claim 5 in which one of said jaws is fixed and the other of said jaws is swingable in relation to the header section on which said hinge clamp is mounted; and an actuating lever carried by said swingable jaw for engaging said bar and pivoting said swingable jaw into its closed position.

7. The folding header assembly of claim 6 in which said hinge clamp includes spring means urging said swingable jaw into its open position.

8. The folding header assembly of claims 6 or 7 in which a pair of upper and lower locking pins are engagable with said swingable jaws of said upper and lower hinge assemblies, respectively, for locking and unlocking said swingable jaws in closed positions; said actuating means including upper and lower camming means engabable with said upper and lower locking pins for urging the same into locking and unlocking positions; and connecting means movably mounted on said adjacent section and operatively connecting said upper and lower camming means for simultaneously shifting one of the pair of said locking pins into locking position and the other of the pins of said pair into unlocking position and, conversely, for simultaneously shifting the other of the pins of said pair into locking position and said one of said pins of said pair into unlocking position.

9. The folding header assembly of claim 8 in which said connecting means includes a connecting bar; and first power means for moving said connecting bar for shifting said pins into locking and unlocking positions.

10. The folding header assembly of claim 8 in which each of said locking pins has a beveled surface engagable with one of said swingable jaws for camming said jaw into tightly closed position when said beveled surface engages said jaw and said locking pin is shifted into its locking position.

11. The folding header assembly of claim 1 in which said lower hinge assembly has a generally horizontal pivot axis fixed in relation to said center section; means supporting said upper hinge assembly upon said center section for movement of the pivot axis thereof between a normally horizontal position and a generally vertical position; and second power means connected to said supporting means for shifting the pivot axis of said upper hinge assembly between said horizontal and vertical positions.

12. The folding header assembly of claim 11 in which said second power means is also connected to each of said wing sections for folding and unfolding the same about the pivot axes of said upper hinge assemblies.

13. The folding header assembly of claim 11 in which said means for supporting each upper hinge assembly includes a carriage mounted upon said center section for generally horizontal movement between an outwardly extended position and an inwardly retracted position; and third power means operatively connected to said carriage for moving the same between extended and retracted positions.

14. The folding header assembly of claim 13 in which said third power means for shifting said carriage inwardly an outwardly comprises a rack gear affixed to said carriage and a pinion gear engaging said rack gear and driven by motor means.

15. The folding header assembly of claim 1 in which a center auger section is rotatably mounted upon said center section of said header assembly and wing auger sections are rotatably carried by said wing sections of said assembly; and coupling means operatively connecting said center auger section and said wing auger sections together when said wing sections of said header are normally disposed in general horizontal alignment with said center section of said header; said coupling means being pivotal to maintain said auger sections in operative engagement as said wing sections of said header pivot upwardly and downwardly about the axes of said lower hinge assemblies when said header assembly traverses uneven terrain.

16. The folding header assembly of claim 15 in which said coupling means comprises telescoping shaft and tube extensions of said auger sections extending between said center header section and each of said wing sections; and universal joints supporting each of said extensions and connecting the same to their respective auger sections.

17. The folding header assembly of claim 16 in which each of said auger sections includes an outer cylindrical shell; and spring means extending radially between the shell of each auger section and the respective shaft and tube extensions thereof for yieldably supporting said extensions in centered positions.

18. The folding header assembly of claim 17 in which each of said tube extensions has a free end portion of outwardly-flared frusto-conical configuration and said shaft extension telescopingly receivably in said tube extensions having a rounded free end and at least one longitudinally-elongated groove defining an external keyway; and locking means provided by said tube extension for engaging said shaft extension within said keyway and locking said extensions against independent relative rotation.

19. The folding header assembly of claim 18 in which said locking means comprises a locking pin mounted upon said tube extension for limited radial movement between an outwardly retracted position and an inwardly extended position; and spring means urging said pin inwardly into its extended position.

20. The folding header assembly of claim 19 in which said locking pin has a beveled inner face engagable with said rounded end of said shaft extension for camming said pin into retracted position when said shaft extension is telescoped into said tube extension.

21. A combine harvester having a folding header assembly; said header assembly comprising a center section mounted upon said combine harvester at the front end thereof and a pair of wing sections normally disposed at opposite ends of said center section and in generally horizontal alignment therewith; a pair of vertically-spaced upper and lower hinge assemblies disposed at each end of said center section between said center section and said wing section; each hinge assembly having hinge elements capable of being coupled and uncoupled; operating means connected to each pair of upper and lower hinge assemblies for selectively coupling only one of the assemblies of each pair while uncoupling the other of the assemblies of each pair; said wing sections being pivotally movable upwardly and downwardly about the hinge axes of the lower hinge assemblies, when said lower hinge assemblies are coupled and said upper hinge assemblies are uncoupled, to allow said wing sections to traverse uneven terrain; said wing sections being foldable upwardly about the hinge axes of said upper hinge assemblies, when said upper hinge assemblies are coupled and said lower hinge assemblies are uncoupled, to reduce the width of said header assembly in transit.

22. The combine harvester of claim 21 in which the elements of said hinge assemblies include a hinge bar provided by one of said header sections and at least one hinge clamp operatively engagable with said hinge bar and provided by an adjacent header section.

23. The combine harvester of claim 22 in which said hinge clamp includes a pair of arcuate clamping jaws pivotally connected for relative movement between open and closed positions; said jaws, when closed, rotatably receiving and retaining said hinge bar and, when open, allowing disengagement of said bar from said hinge clamp.

24. The combine harvester of claim 22 in which one of said jaws is fixed and the other of said jaws is swingable in relation to the header section on which said hinge clamp is mounted; and an actuating lever carried by said swingable jaw for engaging said bar and pivoting said swingable jaw towards its closed position.

25. The combine harvester of claim 24 in which said hinge clamp includes spring means urging said swingable jaw into open position.

26. The combine harvester of claims 24 or 25 in which a pair of upper and lower locking pins are engagable with said swingable jaws of said upper and lower hinge assemblies, respectively, for locking and unlocking said swingable jaws; said operating means including upper and lower camming means engagable with said upper and lower locking pins for urging the same into locking and unlocking positions; and connecting means movably mounted on said adjacent section and operatively connecting said upper and lower camming means for simultaneously shifting one of the locking pins of each pair into locking position and the other of the pins of each pair into unlocking position and, conversely, for simultaneously shifting the other of the pins of each pair into locking position and said one of said pins of each pair into unlocking position.

27. The combine harvester of claim 26 in which said connecting means includes a connecting bar; and first power means for moving said connecting bar to shift said pins into locking and unlocking positions.

28. The combine harvester of claim 26 in which each of said locking pins has a beveled surface engagable with one of said swinging jaws for camming said jaw into fully closed position when said beveled surface engages said jaw and said locking pin is shifted into its locking position.

29. The combine harvester of claim 21 in which said lower hinge assembly has a generally horizontal hinge axis fixed in relation to said center section; means supporting said upper hinge assembly upon said center section for movement of the hinge axis thereof between normally horizontal position and a generally vertical position; and second power means connected to said supporting means for shifting the hinge axis of said upper hinge assembly between said horizontal and vertical positions.

30. The combine harvester of claim 29 in which said second power means is also connected to each of said wing sections for swinging said wing sections about said hinge axes between said normal horizontal positions in general alignment with said center section and upwardly-extending raised positions.

31. The combine harvester of claims 29 or 30 in which said means for supporting each upper hinge assembly includes a carriage mounted upon said center section for generally horizontal movement between an outwardly extended position and an inwardly retracted position; and third power means operatively connected to said carrige for moving the same between said extended and retracted positions, whereby, said wing sections of said header assembly may be pivoted upwardly into raised positions about the hinge axes of said upper hinge assemblies, then retracted inwardly, and then tipped rearwardly into lay back positions for road travel of said combine harvester.

32. The combine harvester of claim 21 in which a center auger section is rotatably mounted upon said center section of said header assembly and wing auger sections are rotatably carried by said wing sections of said auger assembly; and coupling means operatively connecting said center auger section and said wing auger sections together when said wing sections of said header are normally disposed in general horizontal alignment with said center section of said header; said coupling means being yieldable to maintain said auger sections in operative engagement as said wing sections of said header assembly pivot upwardly and downwardly about the axes of said lower hinge assemblies when said header assembly traverses uneven terrain.

33. The combine harvester of claim 32 in which said coupling means comprises telescoping shaft and tube extensions extending between said center header section and each of said wing sections; and universal joints supporting each of said extensions and connecting the same to their respective auger sections.

34. The combine harvester of claim 33 in which each of said auger sections includes an outer cyindrical tube; and spring means extending radially between the outer tube of said auger sections and the respective shaft and tube extensions therein for yieldably supporting said extensions in coaxial relation with said outer tubes.

35. The combine harvester of claim 34 in which said tube extension has a free end portion of outwardly-flared frusto-conical configuration and said shaft extension has a rounded free end and at least one longitudinally-elongated groove defining an external keyway; and locking means provided by said tube extension for engaging said shaft extension within said keyway and locking said extensions against independent relative rotation.

36. The combine harvester of claim 35 in which said locking means comprises a locking pin mounted upon said tube extension for limited radial movement between an outwardly retracted position and an inwardly extended position; and spring means urging said pin inwardly into its extended position.

* * * * *